(12) United States Patent
Shin et al.

(10) Patent No.: US 12,341,218 B2
(45) Date of Patent: Jun. 24, 2025

(54) BATTERY MODULE, BATTERY RACK COMPRISING SAME, AND POWER STORAGE DEVICE

(71) Applicant: LG ENERGY SOLUTION, LTD., Seoul (KR)

(72) Inventors: Eun-Gyu Shin, Daejeon (KR); Jeong-O Mun, Daejeon (KR); Jae-Min Yoo, Daejeon (KR); Yoon-Koo Lee, Daejeon (KR); Yong-Seok Choi, Daejeon (KR); Jee-Soon Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/505,866

(22) Filed: Nov. 9, 2023

(65) Prior Publication Data

US 2024/0079721 A1    Mar. 7, 2024

Related U.S. Application Data

(63) Continuation of application No. 17/431,388, filed as application No. PCT/KR2020/008193 on Jun. 23, 2020, now Pat. No. 11,870,094.

(30) Foreign Application Priority Data

Jul. 3, 2019   (KR) .................. 10-2019-0080195

(51) Int. Cl.
*H01M 50/383*   (2021.01)
*H01M 10/613*   (2014.01)
(Continued)

(52) U.S. Cl.
CPC ....... *H01M 50/383* (2021.01); *H01M 10/613* (2015.04); *H01M 10/627* (2015.04);
(Continued)

(58) Field of Classification Search
None
See application file for complete search history.

(56) References Cited

U.S. PATENT DOCUMENTS 8,268,469 B2    9/2012  Hermann et al.
2008/0220320 A1 9/2008  Horikoshi et al.
(Continued)

FOREIGN PATENT DOCUMENTS

CN    106785225 A    5/2017
CN    109904356 A    6/2019
(Continued)

OTHER PUBLICATIONS

Extended European Search Report for European Application No. 20834689.0, dated May 27, 2022.
(Continued)

*Primary Examiner* — Lisa S Park
(74) *Attorney, Agent, or Firm* — Birch, Stewart, Kolasch & Birch, LLP

(57) ABSTRACT

A battery module includes at least two cell assemblies, a module housing having an upper cover formed by a top portion and a first side portion extending downward from a first side edge of the top portion, a first gas passage formed between the first side portion of the upper cover and a first side of the at least two cell assemblies for circulation of gas generated from the at least two cell assemblies, and a flame retardant plate in the first gas passage and extending between the at least two cell assemblies and the module housing, wherein the first side portion of the upper cover is coupled to the flame retardant plate.

16 Claims, 10 Drawing Sheets

(51) Int. Cl.
*H01M 10/627* (2014.01)
*H01M 10/6555* (2014.01)
*H01M 10/658* (2014.01)
*H01M 50/507* (2021.01)

(52) U.S. Cl.
CPC ..... *H01M 10/6555* (2015.04); *H01M 10/658* (2015.04); *H01M 50/507* (2021.01); *H01M 2220/10* (2013.01)

(56) References Cited

U.S. PATENT DOCUMENTS

| | | |
|---|---|---|
| 2010/0183910 A1 | 7/2010 | Nishino et al. |
| 2011/0159340 A1 | 6/2011 | Hu et al. |
| 2011/0195291 A1 | 8/2011 | Yokoyama et al. |
| 2011/0274951 A1* | 11/2011 | Yasui .................. H01M 50/512 429/99 |
| 2012/0028107 A1* | 2/2012 | Sugita ............... H01M 10/6555 429/156 |
| 2012/0114993 A1 | 5/2012 | Park et al. |
| 2014/0322581 A1* | 10/2014 | Ruter .................. H01M 50/503 429/186 |
| 2016/0093842 A1 | 3/2016 | Blanco et al. |
| 2018/0138478 A1* | 5/2018 | Chan .................. H01M 50/271 |
| 2018/0194235 A1 | 7/2018 | Kim et al. |
| 2019/0168615 A1 | 6/2019 | Besson et al. |
| 2019/0334141 A1 | 10/2019 | Kwon et al. |
| 2019/0386350 A1 | 12/2019 | Sato |
| 2020/0030766 A1 | 1/2020 | Lee et al. |
| 2020/0287179 A1 | 9/2020 | Wang et al. |
| 2021/0175570 A1 | 6/2021 | Nishino et al. |

FOREIGN PATENT DOCUMENTS

| | | |
|---|---|---|
| EP | 3 598 564 A1 | 1/2020 |
| JP | 2008-218210 A | 9/2008 |
| JP | 2009-21223 A | 1/2009 |
| JP | 2009-176455 A | 8/2009 |
| JP | 3177969 U | 8/2012 |
| JP | 5137480 B2 | 2/2013 |
| JP | 2013-251127 A | 12/2013 |
| JP | 2014-90782 A | 5/2014 |
| JP | 5749200 B2 | 7/2015 |
| JP | 2016-85128 A | 5/2016 |
| JP | 5933344 B2 | 6/2016 |
| JP | 2017-524240 A | 8/2017 |
| JP | 2018-148726 A | 9/2018 |
| JP | 2018-206605 A | 12/2018 |
| JP | 2019-500736 A | 1/2019 |
| KR | 10-0314511 B1 | 11/2001 |
| KR | 10-2009-0077418 A | 7/2009 |
| KR | 10-2042577 B1 | 11/2019 |
| WO | WO 2010/098067 A1 | 9/2010 |
| WO | WO 2015/179625 A1 | 11/2015 |
| WO | WO 2019/098231 A1 | 5/2019 |

OTHER PUBLICATIONS http://web.archive.org/web/20151109053631/http://www.homedepot.com:80/p/ClosetMaid-2-19-in-x-2-19-in-White-Low-Profile-Wall-Brackets-2-Pack-6641/202657631 (Year: 2015).
International Search Report for PCT/KR2020/008193 (PCT/ISA/210) mailed on Oct. 28, 2020.

* cited by examiner

BATTERY MODULE, BATTERY RACK COMPRISING SAME, AND POWER STORAGE DEVICE

CROSS-REFERENCE TO RELATED APPLICATIONS

This application is a Continuation of application Ser. No. 17/431,388 filed on Aug. 16, 2021, which is a National Phase of PCT International Application No. PCT/KR2020/008193 filed on Jun. 23, 2020, which claims priority under 35 U.S.C. § 119(a) to Patent Application No. 10-2019-0080195 filed in the Republic of Korea on Jul. 3, 2019, all of which are hereby expressly incorporated by reference in their entirety into the present application.

TECHNICAL FIELD

The present disclosure relates to a battery module with a flame retardant plate, a battery rack and an energy storage system comprising the same, and more particularly, to a battery module having the reduced risk of secondary fire or explosion.

The present application claims the benefit of Korean Patent Application No. 10-2019-0080195 filed on Jul. 3, 2019 with the Korean Intellectual Property Office, the disclosure of which is incorporated herein by reference in its entirety.

BACKGROUND ART

Currently, commercially available secondary batteries include nickel cadmium batteries, nickel hydride batteries, nickel zinc batteries, lithium secondary batteries, etc., and among them, lithium secondary batteries have little or no memory effect, and thus they are gaining more attention than nickel-based secondary batteries for their advantages that recharging can be done whenever it is convenient, the self-discharge rate is very low and the energy density is high.

The lithium secondary battery mainly uses lithium-based oxide and a carbon material for a positive electrode active material and a negative electrode active material respectively. The lithium secondary battery includes an electrode assembly including a positive electrode plate coated with the positive electrode active material, a negative electrode plate coated with the negative electrode active material and a separator interposed between, and a hermetically sealed packaging material or battery pouch case in which the electrode assembly is received together with an electrolyte solution.

More recently, secondary batteries are being widely used in not only small devices such as portable electronic products but also medium- and large-scale devices such as vehicles and energy storage systems (ESSs). For use in medium- and large-scale devices, many secondary batteries are electrically connected to increase the capacity and output. In particular, pouch-type secondary batteries are widely used in medium- and large-scale devices because they are easy to stack.

With the growing need for a large-capacity structure for use as an energy storage source, there is an increasing demand for a battery rack including a plurality of secondary batteries electrically connected in series and/or parallel, a battery module to receive the secondary batteries and a battery management system (BMS).

The battery rack generally includes a housing made of metal material to protect or receive and store the plurality of secondary batteries from external impacts. The demand for high-capacity battery racks is increasing in recent years.

However, the battery rack includes a plurality of battery modules, and when a fire or explosion occurs in a secondary battery of each battery module, heat or flames may spread to adjacent secondary batteries, causing a secondary explosion, and accordingly, many efforts have been made to prevent secondary fires or explosions.

Moreover, when a fire occurs in a secondary battery, flames may spread to adjacent secondary batteries through a gas passage formed to release gas, and accordingly there is a need to develop a technology to prevent it.

DISCLOSURE

Technical Problem

The present disclosure is designed to solve the above-described problem, and therefore the present disclosure is directed to providing a battery module having the reduced risk of secondary fire or explosion.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To achieve the above-described object, a battery module according to the present disclosure includes at least two cell assemblies each of the at least two cell assemblies including a plurality of secondary batteries electrically connected to each other and stacked in a front-rear direction, a module housing having an internal space in which the at least two cell assemblies is received, and a gas passage on at least one of a left side or a right side of the at least two cell assemblies for circulation of gas generated from the at least two cell assemblies, and a flame retardant plate including a body formed in a plate shape and interposed between the at least two cell assemblies, and a flame barrier extending in a left-right direction from at least one of left end or right end of the body and disposed in part of the gas passage.

Additionally, the battery module may further include a busbar assembly including at least one busbar that comes into contact with an electrode terminal provided in the plurality of secondary batteries to electrically connect the plurality of secondary batteries, and at least two busbar frames in which the at least one busbar is mounted, and provided on each of left and right sides of the at least two cell assemblies.

Additionally, the gas passage may be a space formed between an outer surface of the busbar frame and an inner surface of the module housing.

Additionally, the flame barrier may have a plurality of gas vent holes that is open in the front-rear direction to allow gas generated from the at least two cell assemblies to flow.

Additionally, the module housing may have a gas outlet in communication with an end of the gas passage, and the plurality of gas vent holes may continuously reduce in opening size of the hole as it goes toward the gas outlet.

Additionally, the module housing may have a gas outlet in communication with an end of the gas passage, and the flame barrier may include a guide structure to guide gas generated from the cell assembly to move toward the plurality of gas vent holes.

Additionally, an inner surface of the module housing may have an insertion protrusion having a slit into which a portion of the flame barrier is inserted.

Additionally, the flame retardant plate may have a multilayer structure including at least one of a flame retardant layer, a heat insulating layer configured to prevent heat transfer, an expandable layer that expands its volume at a predetermined temperature, and a heat absorbing layer configured to absorb heat at a predetermined temperature.

Additionally, the multilayer structure may be a structure in which the expandable layer is interposed between the two flame retardant layers, or a structure in which the heat insulating layer is interposed between the two flame retardant layers.

Additionally, the cell assembly may include at least one of a heat absorbing pad between the plurality of secondary batteries configured to absorb heat through an endothermic reaction at a predetermined temperature or a heat insulating pad configured to prevent heat transfer.

In addition, to achieve the above-described object, a battery rack according to the present disclosure includes a plurality of the battery modules, and a rack case in which the plurality of battery modules is received in such a manner that the battery modules are stacked in a vertical direction.

Additionally, the battery rack may include a flame retardant cover interposed between the plurality of battery modules to cover a top or a bottom of the battery module.

Additionally, at least a portion of an outer periphery of the flame retardant cover may extend such that it is exposed to outside from between the plurality of battery modules, and the extended outer periphery of the flame retardant cover may be bent upward.

Additionally, the flame retardant cover may have a concave-convex structure bent at a predetermined interval.

In addition, to achieve the above-described object, an energy storage system according to the present disclosure includes the battery rack.

Advantageous Effects

According to an aspect of the present disclosure, the battery module of the present disclosure includes the flame retardant plate having the body interposed between two or more cell assemblies and the flame barrier extending in the left-right direction from the body and disposed in part of the gas passage, and thus even if a fire occurs in any one of the at least two cell assemblies, it is possible to prevent the fire from spreading to the adjacent cell assembly.

In addition, according to an aspect of an embodiment of the present disclosure, the battery module of the present disclosure may allow gas generated from the cell assembly to move through the plurality of gas vent holes provided in the flame barrier of the flame retardant plate. The flame barrier may stably prevent flames generated from the cell assembly from spreading to the adjacent cell assembly.

According to another aspect of the present disclosure, the flame retardant plate includes has a multilayer structure including at least one of the flame retardant layer that is hard to burn, the heat insulating layer configured to prevent heat transfer, the expandable layer that expands in volume at a predetermined temperature, and the heat absorbing layer configured to absorb heat at a predetermined temperature, thereby effectively preventing the spread of fires between the plurality of cell assemblies in the battery module.

Further, according to another aspect of the present disclosure, the battery rack extends such that at least a portion of the outer periphery of the flame retardant cover is exposed to the outside from between a plurality of battery modules, and the extended outer periphery of the flame retardant cover is bent upward, thereby effectively preventing fires from spreading in the vertical direction to the plurality of battery modules stacked in the vertical direction. Accordingly, it is possible to increase the safety of the battery rack.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Figure 1:
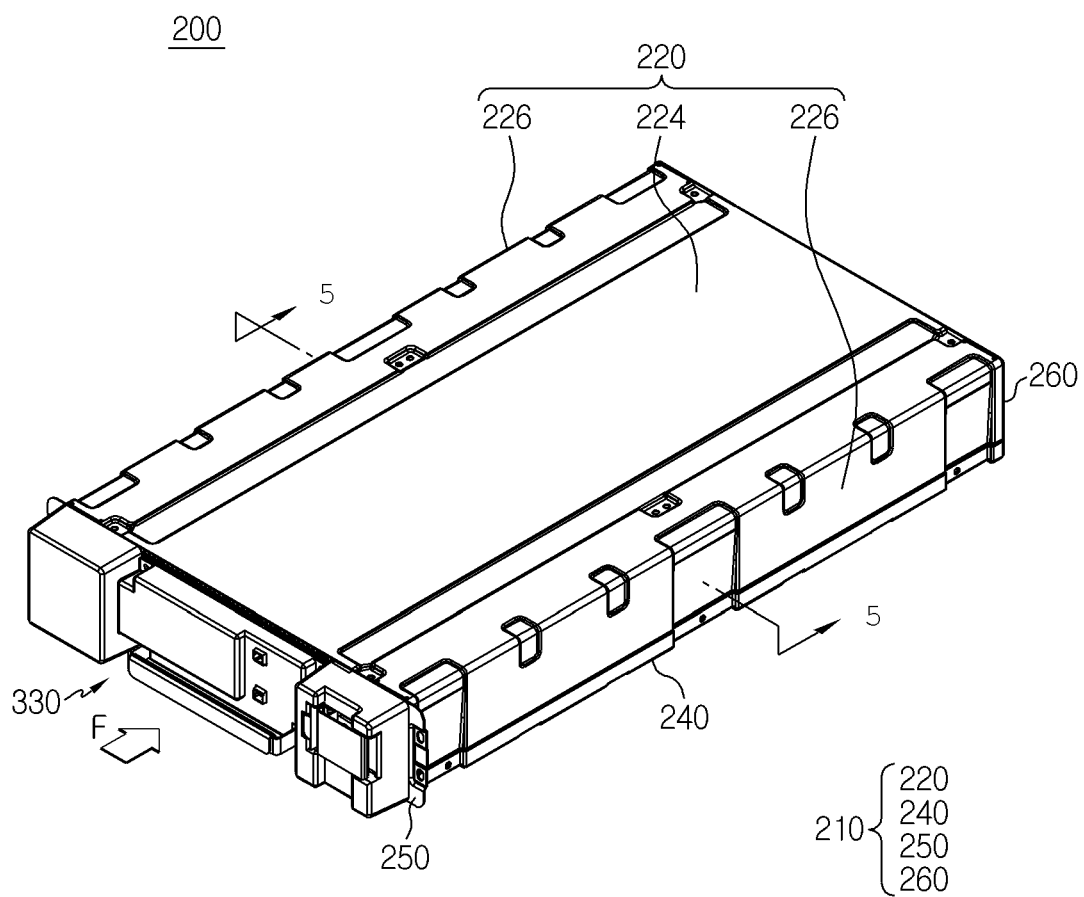
FIG. 1 is a schematic perspective view of a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
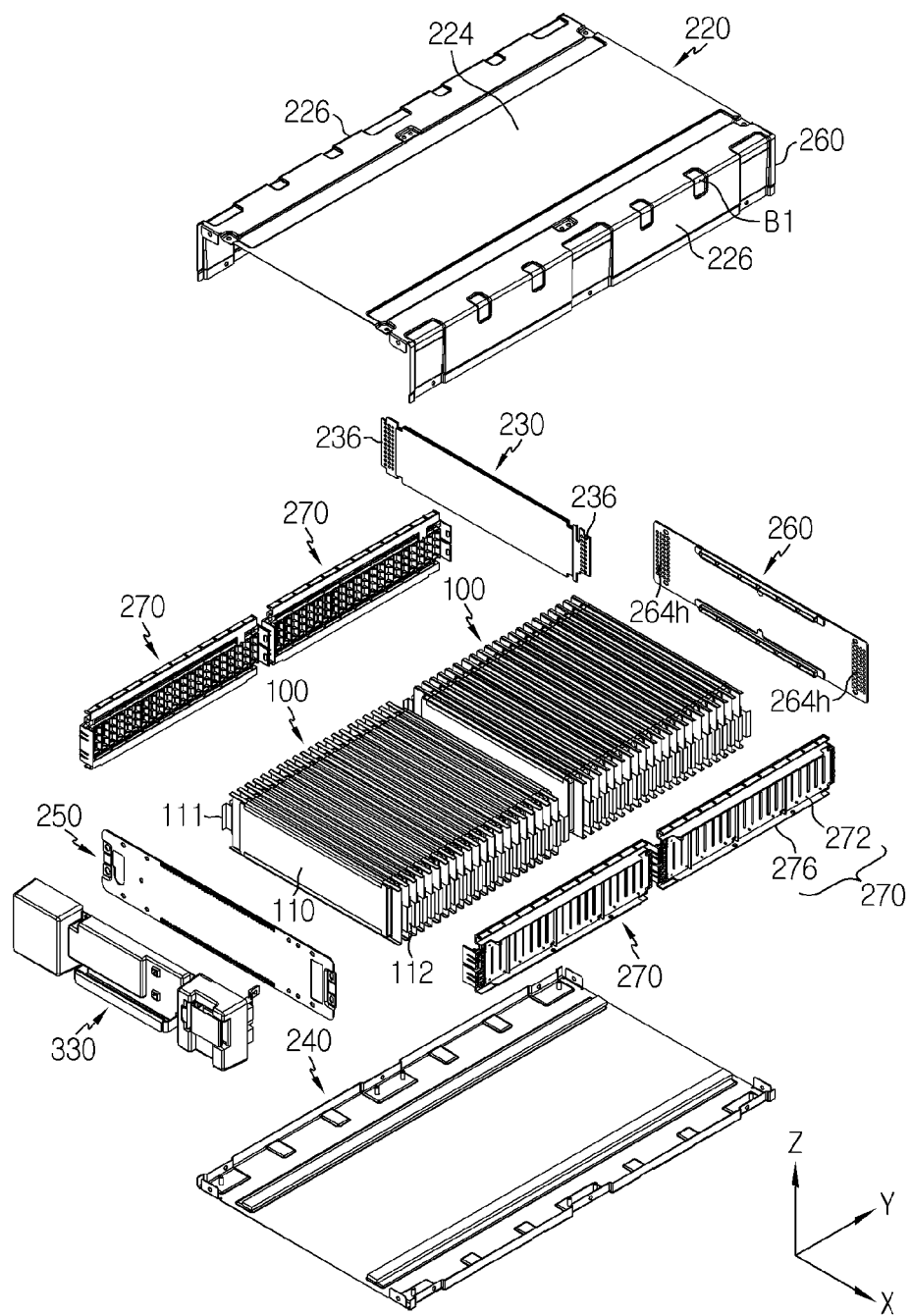
FIG. 2 is a schematic exploded perspective view of a battery module according to an embodiment of the present disclosure.

FIG. 1 is a schematic perspective view of a battery module according to an embodiment of the present disclosure. FIG. 2 is a schematic exploded perspective view of the battery module according to an embodiment of the present disclosure.

Referring to FIGS. 1 and 2, the battery module 200 according to an embodiment of the present disclosure includes at least two cell assemblies 100, a module housing 210 and a flame retardant plate 230.

Specifically, the battery module 200 may include a connection busbar 272 to electrically connect the at least two cell assemblies 100 to each other. For example, the connection busbar 272 may be an alloy including metal such as copper, nickel and aluminum having high electrical conductivity.

Each of the at least two cell assemblies 100 may include a plurality of secondary batteries 110 stacked in a front-rear direction. The secondary battery 110 may be a pouch-type secondary battery 110. For example, as shown in FIG. 2, each of the two cell assemblies 100 may include 21 pouch-type secondary batteries 110 stacked in parallel in the front-rear direction (y direction).

In particular, the pouch-type secondary battery 110 may include an electrode assembly (not shown), an electrolyte (not shown) and a pouch 116.

Each of the secondary batteries 110 stands in a direction (z direction) perpendicular to the ground with two wide surfaces disposed in the front and rear directions and sealing portions disposed in the up, down, left and right directions, when viewed in the direction F (shown in FIG. 1). In other words, each secondary battery 110 may stand upright in the vertical direction. In the specification, unless otherwise specified, the up, down, front, rear, left, and right directions are defined when viewed from the direction F.

Here, the pouch may have a recess-shaped receiving portion. An electrode assembly and an electrolyte may be received in the receiving portion. Each pouch may have an outer insulating layer, a metal layer and an inner adhesive layer, and the inner adhesive layers adhere to each other at the edges of the pouch to form a sealing portion. A terrace portion may be formed at each end in the left-right direction (x direction) where a positive electrode lead 111 and a negative electrode lead 112 of the secondary battery 110 are formed.

The electrode assembly may be an assembly of an electrode plate coated with an electrode active material and a separator, and may include at least one positive electrode plate and at least one negative electrode plate with the separator interposed between. A positive electrode tab may be provided on the positive electrode plate of the electrode assembly, and at least one positive electrode tab may be connected to the positive electrode lead 111.

Here, the positive electrode lead 111 may have one end connected to the positive electrode tab and the other end exposed to the outside of the pouch 116, and the exposed portion may act as an electrode terminal of the secondary battery 110, for example, a positive terminal of the secondary battery 110.

A negative electrode tab may be provided on the negative electrode plate of the electrode assembly, and at least one negative electrode tab may be connected to the negative electrode lead 112. The negative electrode lead 112 may have one end connected to the negative electrode tab and the other end exposed to the outside of the pouch, and the exposed portion may act as an electrode terminal of the secondary battery 110, for example, a negative terminal of the secondary battery 110.

As shown in FIG. 1, when viewed in the direction F, the positive electrode lead 111 and the negative electrode lead 112 may be formed at the left and right ends in opposite directions (x direction) with respect to the center of the secondary battery 110. That is, the positive electrode lead 111 may be provided at one end (the left end) with respect to the center of the secondary battery 110. The negative electrode lead 112 may be provided at the other end (the right end) of the secondary battery 110 with respect to the center of the secondary battery 110.

For example, as shown in FIG. 2, each secondary battery 110 of the cell assembly 100 may have the positive electrode lead 111 and the negative electrode lead 112 extending in the left-right direction.

Here, the terms representing the directions such as front, rear, left, right, up, and down may vary depending on the position of the observer or the placement of the object. However, in the specification, for convenience of description, the directions such as front, rear, left, right, up, and down are defined when viewed from the direction F.

According to this configuration of the present disclosure, it is possible to increase the area of the electrode lead without interference between the positive electrode lead 111 and the negative electrode lead 112 of one secondary battery 110.

The positive electrode lead 111 and the negative electrode lead 112 may be formed in the shape of a plate. In particular, the positive electrode lead 111 and the negative electrode lead 112 may extend in the horizontal direction (X direction) with the wide surface standing upright facing the front and rear directions.

Here, the horizontal direction refers to a direction parallel to the ground when the secondary battery 110 is placed on the ground, and may be referred to as at least one direction on a plane perpendicular to the vertical direction.

However, the battery module 200 according to the present disclosure is not limited to the pouch-type secondary battery 110 described above, and may include various secondary batteries 110 well known at the time when the patent application was filed.

The at least two cell assemblies 100 may be arranged in the front-rear direction. For example, as shown in FIG. 2, the two cell assemblies 100 are arranged in the front-rear direction. The two cell assemblies 100 may be spaced a predetermined distance apart from each other.

The module housing 210 may have an internal space in which the cell assembly 100 is received. Specifically, the module housing 210 may include an upper cover 220, a base plate 240, a front cover 250 and a rear cover 260.

Specifically, the base plate 240 may be larger in size than the lower surface of the at least two cell assemblies 100 to mount the at least two cell assemblies 100 on the top. The base plate 240 may be in the shape of a plate extending in the horizontal direction.

The upper cover 220 may have a top portion 224 and a side portion 226. The top portion 224 may be in the shape of a plate extending in the horizontal direction to cover the top of the cell assembly 100. The side portion 226 may be in the shape of a plate extending down from the left and right ends of the top portion 224 to cover the left and right sides of the cell assembly 100.

The side portion 226 may be coupled to a portion of the base plate 240. For example, as shown in FIG. 2, the upper cover 220 may have the top portion 224 in the shape of a plate extending in the front-rear left-right directions. The upper cover 220 may have two side portions 226 extending down from each of the left and right ends of the top portion 224. The lower end of each of the two side portions 226 may be coupled to the left and right ends of the base plate 240. In this instance, the coupling method may be a male-female coupling method or a welding coupling method.

The side portion 226 may have a beading portion B1 protruding in the inward direction toward the secondary battery 110. For example, as shown in FIG. 2, one side portion 226 may have seven beading portions B1 protruding in the inward direction.

The front cover 250 may be configured to cover the front side of the plurality of secondary batteries 110. For example, the front cover 250 may be in the shape of a plate that is larger in size than the front surface of the plurality of secondary batteries 110. The plate shape may stand upright in the vertical direction.

A portion of the outer periphery of the front cover 250 may be coupled to the base plate 240. For example, the lower side of the outer periphery of the front cover 250 may be coupled to the front end of the base plate 240. The upper side of the outer periphery of the front cover 250 may be coupled to the front end of the upper cover 220. Here, the coupling method may include bolt coupling.

The rear cover 260 may be configured to cover the rear side of the cell assembly 100. For example, the rear cover 260 may be in the shape of a plate that is larger in size than the rear surface of the plurality of secondary batteries 110.

A portion of the outer periphery of the rear cover 260 may be coupled to the base plate 240. For example, the lower side of the outer periphery of the rear cover 260 may be coupled to the front end of the base plate 240. The upper side of the outer periphery of the rear cover 260 may be coupled to the rear end of the upper cover 220. Here, the coupling method may include bolt coupling.

According to this configuration of the present disclosure, the module housing 210 is configured to stably protect the plurality of secondary batteries 110 from external impacts, thereby increasing safety of the battery module 200 against external impacts.

Figure 3:
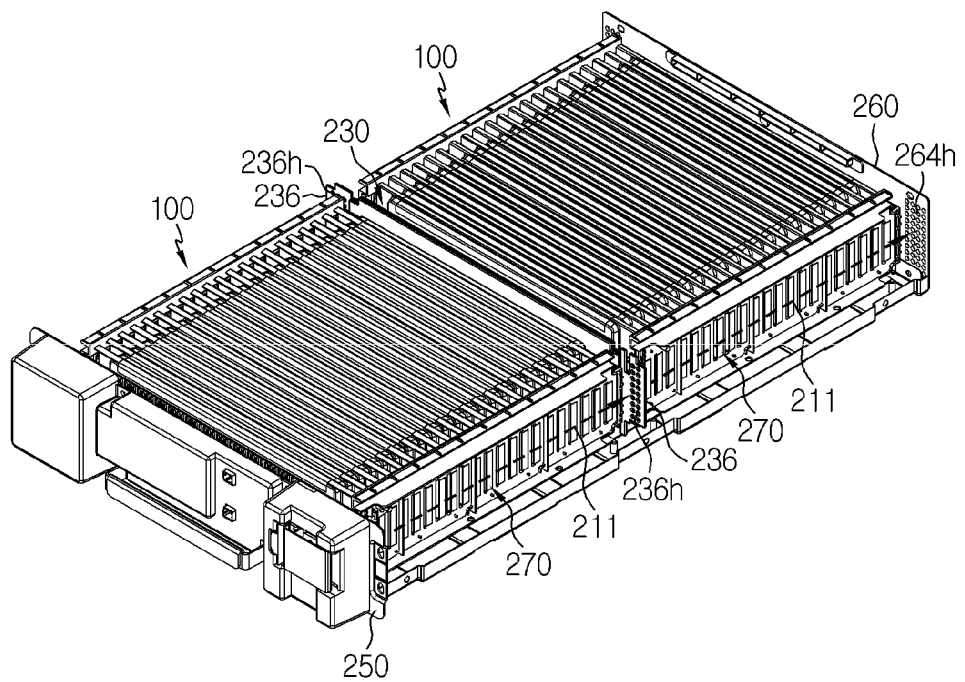
FIG. 3 is a schematic partial perspective view of a battery module according to an embodiment of the present disclosure.

FIG. 3 is a schematic partial perspective view of the battery module according to an embodiment of the present disclosure.

Referring to FIG. 3 along with FIG. 2, the module housing 210 may have a gas passage 211 for circulation of gas generated from the cell assembly 100. Here, the gas passage 211 may be a space extending in the front-rear direction in communication with the outside. The gas passage 211 may be provided on at least one of the left side or the right side of the cell assembly 100. More specifically, the gas passage 211 may be formed in a portion of a space between one of the left and right surfaces of the cell assembly 100 and the inner surface of the module housing 210.

For example, as shown in FIG. 2, two gas passages 211 may be provided between the two side portions 226 of the upper cover 220 and the left and right sides of the cell assembly 100.

The flame retardant plate 230 may include a flame retardant material that is hard to burn. For example, the flame retardant material may be mica, vinyl chloride resin containing chlorine, paraffin chloride, decabromodiphenyl oxide and antimony trioxide.

The flame retardant plate 230 may include a body 231 and a flame barrier 236. The body 231 may be in the shape of a plate standing upright in the vertical direction. That is, the body 231 may have the front and rear sides that are wider than the top, bottom, left and right sides. The body 231 may be interposed between the at least two cell assemblies 100.

The flame barrier 236 may extend in the left-right direction from at least one of the left end or the right end of the body 231. For example, the flame barrier 236 may extend in the left-right direction longer than the cell assembly 100 from the left and right ends of the body 231. The flame barrier 236 may extend such that it is disposed in part of the gas passage 211.

For example, as shown in FIG. 2, the flame retardant plate 230 may be disposed such that the body 231 is interposed between the two cell assemblies 100. The flame barrier 236 may extend from the left and right ends of the body 231 and be disposed in part of the gas passage 211.

That is, when a fire occurs in any one of two or more cell assemblies 100, flames or high temperature gas of the fire occurred in the cell assembly 100 easily spread to the adjacent cell assembly 100 through the gas passage 211. The successive fires between the two or more cell assemblies 100 often lead to a larger fire.

According to this configuration of the present disclosure, the present disclosure includes the body 231 interposed between the two or more cell assemblies 100 and the flame barrier 236 that extends in the left-right direction (X direction) from the body 231 and is disposed in part of the gas passage 211, and thus even if a fire occurs in any one of at least two cell assemblies 100, it is possible to prevent the fire from spreading to the adjacent cell assembly 100.

Referring back to FIG. 2, the battery module 200 may further include a busbar assembly 270. Specifically, the busbar assembly 270 may include at least one busbar 272 configured to electrically interconnect the plurality of secondary batteries 110 and at least two busbar frames 276 having the at least one busbar 272 mounted thereon. The at least two busbar frames 276 may be provided on each of the left and right sides of the cell assembly 100.

Specifically, the busbar 272 may have a conductive metal, for example, copper, aluminum, nickel, or the like.

The busbar frame 276 may have an electrically insulating material. For example, the busbar frame 276 may have a plastic material. More specifically, the plastic material may be polyvinyl chloride.

For example, as shown in FIG. 2, the battery module 200 may include four busbar assemblies 270. Each of the four busbar assemblies 270 may include four busbars 272 and a busbar frame 276 having the four busbars 272 mounted thereon.

Referring to FIG. 3 together with FIG. 2, the gas passage 211 may be a space formed by the outer surface of the busbar frame 276 and the inner surface of the module housing 210. For example, as shown in FIG. 2, the gas passage 211 may be a space formed by the left and right outer surfaces of the busbar frame 276 and the inner surface of the top portion 224 and the side portions 226 of the upper cover 220.

The flame barrier 236 may have a plurality of gas vent holes 236h through which gas generated from the cell assembly 100 flows. The gas vent hole 236h may be an opening that is open in the front-rear direction.

For example, as shown in FIG. 3, the gas passage 211 may be provided on the front and rear sides of the two cell assemblies 100. In addition, the flame barrier 236 of the flame retardant plate 230 may have the plurality of gas vent holes 236h that is open in the front-rear direction, to allow gas generated from the cell assembly 100 to flow.

According to this configuration of the present disclosure, the flame retardant plate 230 may allow the plurality of gas vent holes 236h provided in the flame barrier 236 to gas generated from the cell assembly 100 to move through the plurality of gas vent holes 236h. The flame barrier 236 may stably prevent flames generated from the cell assembly 100 from spreading to the adjacent battery cells.

Referring back to FIGS. 3 and 4, the module housing 210 may have a gas outlet 264h. Specifically, the gas outlet 264h may be provided in the rear cover 260 of the module housing 210. For example, as shown in FIG. 2, two gas outlets 264h may be provided on the left and right sides of the rear cover 260.

The gas outlet 264h may be in communication with the end of the gas passage 211. That is, gas moving through the gas passage 211 may be discharged to the outside through the gas outlet 264h.

According to this configuration of the present disclosure, the module housing 210 of the present disclosure includes the gas outlet 264h to expel gas to the outside, thereby effectively expelling gas generated from the cell assembly 100 to the outside through the gas passage 211 and the gas outlet 264h in communication with the end of the gas passage 211.

Figure 5:
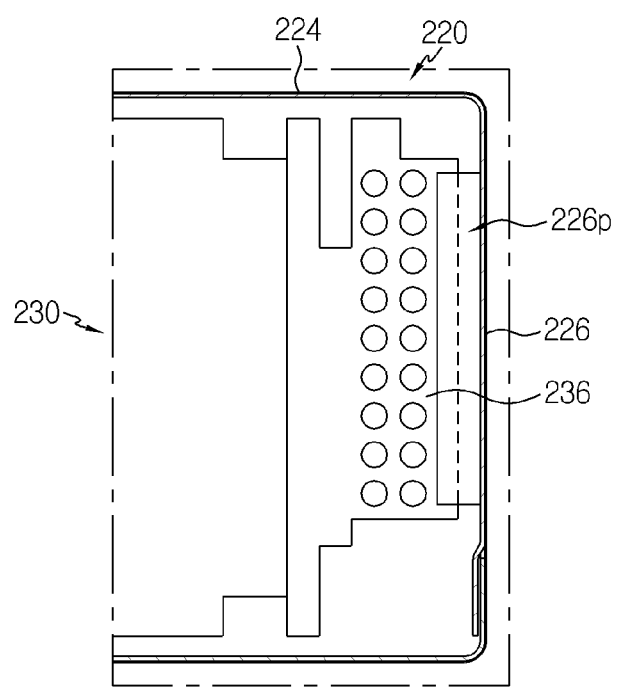
FIG. 5 is a schematic partial cross-sectional view of the battery module taken along the line 5-5 of FIG. 1.

FIG. 5 is a schematic partial cross-sectional view of the battery module taken along the line 5-5 of FIG. 1.

Referring to FIG. 5, an insertion protrusion 226p into which a portion of the flame barrier 236 is inserted may be provided on the inner surface of the module housing 210. The insertion protrusion 226p may have a slit (not shown) into which a portion of the flame barrier 236 is inserted. For example, as shown in FIG. 5, the upper end of the flame barrier 236 of the flame retardant plate 230 may be inserted into and fixed to the insertion protrusion 226p provided on the inner surface of the module housing 210. The insertion protrusion 226p may be formed by connecting portions of two stacked square plates. The slit may be a gap between the two plates.

According to this configuration of the present disclosure, the insertion protrusion 226p having the slit into which a portion of the flame barrier 236 is inserted is provided on the inner surface of the module housing 210, to mount the module housing 210 in the correct position with the guidance of the flame barrier 236, and form the gas passage over a larger area. Accordingly, it is possible to improve the efficiency of the process of manufacturing the battery module 200 and prevent flames from spreading to the adjacent cell assembly 100.

Referring back to FIG. 4, the flame retardant plate 230 may have a multilayer structure. Specifically, the multilayer structure may include at least one of a flame retardant layer, a heat insulating layer, an expandable layer or a heat absorbing layer. Here, the flame retardant layer is a layer that is hard to burn, and may include, for example, a flame retardant material. For example, the flame retardant material may be mica, vinyl chloride resin containing chlorine, paraffin chloride, decabromodiphenyl oxide and antimony trioxide.

The heat insulating layer may be configured to prevent heat transfer. For example, the heat insulating layer may include a glass fiber or a foamed plastic material. That is, the heat insulating layer may prevent heat transfer to the adjacent cell assembly 100 during a fire in the cell assembly 100. Accordingly, it is possible to prevent the fire from spreading.

The expandable layer may include a material in which volume expansion occurs at about 200° C. For example, the volume expandable material may be at least one selected from the group consisting of sodium hydrogen carbonate, potassium hydrogen carbonate, lithium carbonate, ammonium carbonate, benzenesulfonyl hydrazide, semicarbazide, carbazide, azobisformamide, azobisisobutyronitrile and diazo aminobenzene. That is, when the temperature of the cell assembly 100 increases to about 200° C., the expandable layer may be configured to expand so that there is no gap between two or more cell assemblies 100. Accordingly, the expandable layer may block the pathway along which flames may spread between the plurality of cell assemblies 100, or prevent the contact of the high-temperature secondary battery 110 with air so as to prevent the secondary battery 110 from igniting.

The heat absorbing layer may include a heat absorbing material to absorb heat at a predetermined temperature.

For example, the heat absorbing material may be a Phase Change Material (PCM) having high latent heat when it goes through a phase change at a predetermined temperature. The material having a high latent heat may include, but is not limited to, paraffin, polyethylene glycol, inorganic hydrates (for example, $Na_2HPO_4 \cdot 12H_2O$, $Na_2SO_4 \cdot 10H_2O$, $Zn(NO_3)_2 \cdot 6H_2O$). That is, the heat absorbing material may absorb heat to prevent the ignition of the cell assembly 100 when the temperature of the cell assembly 100 increases to 100° C. or above due to a malfunction.

According to this configuration of the present disclosure, the flame retardant plate 230 has a multilayer structure including at least one of the flame retardant layer that is hard to burn, the heat insulating layer configured to prevent heat transfer, the expandable layer that expands its volume at a predetermined temperature, or the heat absorbing layer configured to absorb heat at a predetermined temperature, thereby effectively preventing fires from spreading between the plurality of cell assemblies 100 in the battery module 200.

Figure 4:
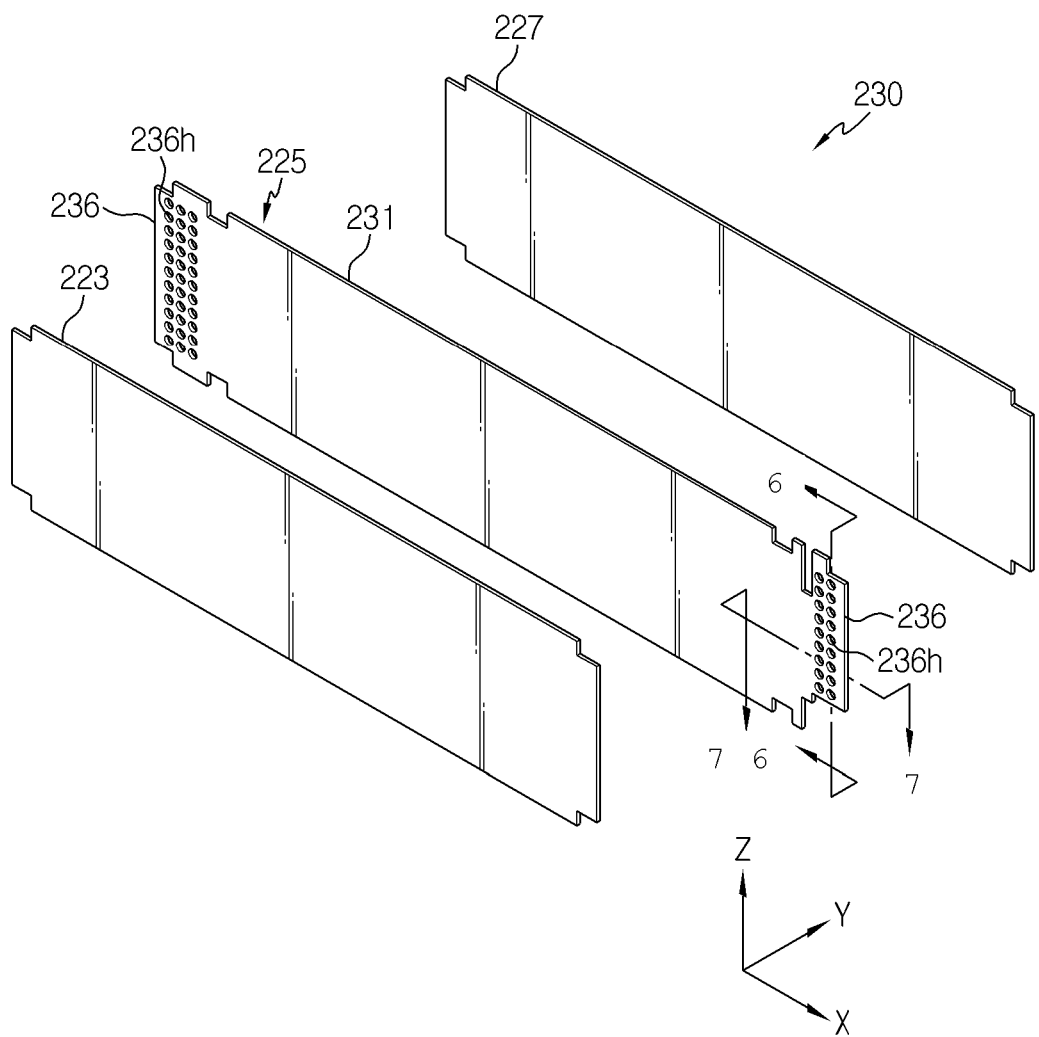
FIG. 4 is a schematic exploded perspective view of a flame retardant plate of a battery module according to an embodiment of the present disclosure.

Preferably, as shown in FIG. 4, the multilayer structure may be a structure in which an expandable layer 225 is interposed between two flame retardant layers 223 and 227. That is, this multilayer structure may be configured such that the flame retardant layers 223 and 227 positioned on two sides of the expandable layer 225 press the cell assembly 100 by the expansion of the expandable layer 225 of the flame retardant plate 230 when a fire occurs in the cell assembly 100. Accordingly, the cell assembly 100 may be compressed by the flame retardant plate 230 to prevent the fire occurred in the cell assembly 100 from spreading.

Alternatively, the multilayer structure of the flame retardant plate 230 according to another embodiment may be a structure in which instead of the expandable layer 225, a heat insulating layer is interposed between two flame retardant layers 223 and 227. That is, the flame retardant plate 230 having a structure in which a heat insulating layer is interposed between two flame retardant layers includes a heat insulating layer (foamed plastic) that is relatively easy to burn or deform as an inner layer, and a flame retardant layer that is hard to burn as an outer layer, thereby stably preventing the spread of fires between the cell assembly 100 without deformation or ignition when a fire occurs in the cell assembly 100.

Figure 6:
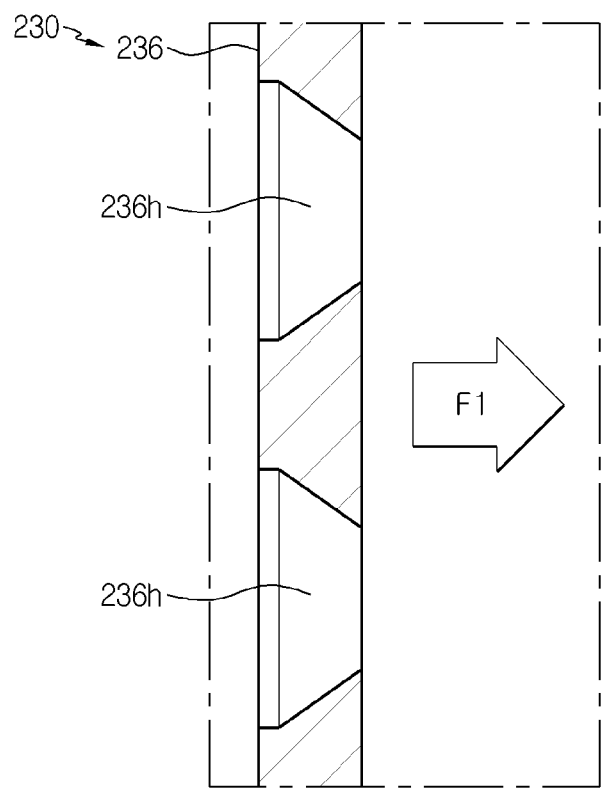
FIG. 6 is a schematic partial cross-sectional view of the flame retardant plate taken along the line 6-6 of FIG. 4.

FIG. 6 is a schematic partial cross-sectional view of the flame retardant plate taken along the line 6-6 of FIG. 4.

Referring to FIG. 6 together with FIGS. 3 and 4, the gas vent hole 236h may be configured to guide gas generated from the cell assembly 100 to move toward the gas outlet 264h in the direction F1. For example, the gas vent hole 236h may continuously reduce in the opening size of the hole as it goes toward the gas outlet 264h in the direction F1. For example, as shown in FIG. 6, the opening of the gas vent hole 236h may be continuously narrower as it goes toward the gas outlet 264h.

That is, as the inner diameter of the gas vent hole 236h is smaller, the gas movement speed may be faster. Accordingly, the flame retardant plate 230 according to the present disclosure may effectively guide gas to move fast toward the gas outlet 264h in the direction F1.

According to this configuration of the present disclosure, the gas vent hole 236h has a narrower size as it goes toward the gas outlet 264h to prevent a fire in some secondary batteries 110 of the cell assembly 100 from spreading to the adjacent cell assembly 100.

Figure 7:
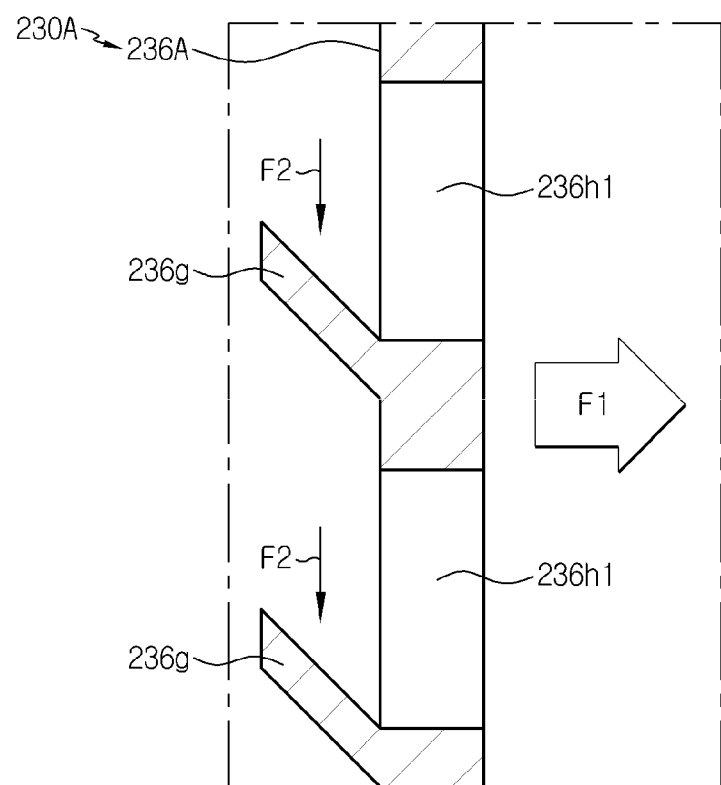
FIG. 7 is a schematic partial cross-sectional view of the flame retardant plate taken along the line 7-7 of FIG. 4.

FIG. 7 is a schematic partial cross-sectional view of the flame retardant plate taken along the line 7-7 of FIG. 4.

Referring to FIG. 7 together with FIG. 3, the battery module 200 manufactured according to another embodiment of the present disclosure may have a guide structure 236g in which the flame barrier 236 guides gas generated from the cell assembly 100 to move toward the gas outlet 264h in the direction F1. The guide structure 236g may extend in the front-rear direction (Y direction in FIG. 2) and the left-right direction (Z direction in FIG. 2) from the surface of the flame barrier 236.

For example, as shown in FIG. 7, the flame barrier 236 may have a plurality of gas vent holes 236h1 and a guide structure 236g may be provided near each of the plurality of gas vent holes 236h1. The guide structure 236g may extend in the diagonal direction. Accordingly, when gas generated from the cell assembly 100 moves in the left or right direction F2 from the cell assembly 100, the guide structure 236g may guide the gas to move to the gas vent hole 236h1 provided in the flame barrier 236 disposed closer to the gas outlet 264h.

According to this configuration of the present disclosure, the flame barrier 236 according to another embodiment of the present disclosure may prevent gas from flowing in the direction opposite to the direction in which the gas outlet 264h is disposed, using the guide structure 236g for guiding the gas generated from the cell assembly 100 to move toward the gas vent hole 236h1.

Figure 8:
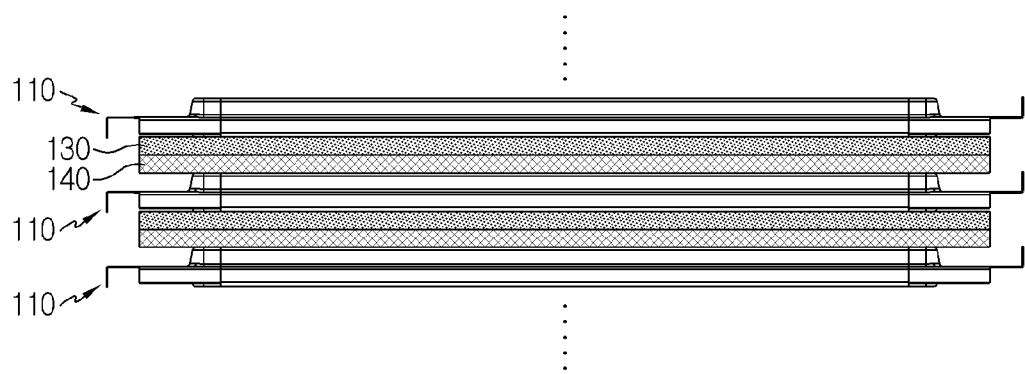
FIG. 8 is a schematic partial plane view of a battery module according to another embodiment of the present disclosure.

FIG. 8 is a schematic partial plane view of a battery module according to another embodiment of the present disclosure.

Referring to FIG. 8 together with FIG. 2, the cell assembly 100 may include at least one of a heat absorbing pad 130 configured to absorb heat through an endothermic reaction at a predetermined temperature between the plurality of secondary batteries 110, or a heat insulating pad 140 configured to prevent heat transfer. Here, the heat absorbing pad 130 may include a heat absorbing material. For example, the heat absorbing material may be a Phase Change Material (PCM) having high latent heat when it goes through a phase change at a predetermined temperature. The material having a high latent heat may include, but is not limited to, paraffin, polyethylene glycol, inorganic hydrates (for example, $Na_2HPO_4 \cdot 12H_2O$, $Na_2SO_4 \cdot 10H_2O$, $Zn(NO_3)_2 \cdot 6H_2O$).

That is, when a fire occurs in the secondary battery 110, the heat absorbing pad 130 interposed between the plurality of secondary batteries 110 may effectively reduce the temperature of the secondary battery 110 by the material causing a phase change, thereby preventing the fire from spreading to the adjacent secondary battery 110.

The heat insulating pad 140 may include, for example, a glass fiber or a foamed plastic material. That is, the heat insulating pad 140 may prevent heat transfer to the adjacent cell assembly 100 during a fire in the cell assembly 100. Accordingly, it is possible to prevent the fire from spreading between the plurality of secondary batteries 110.

Figure 9:
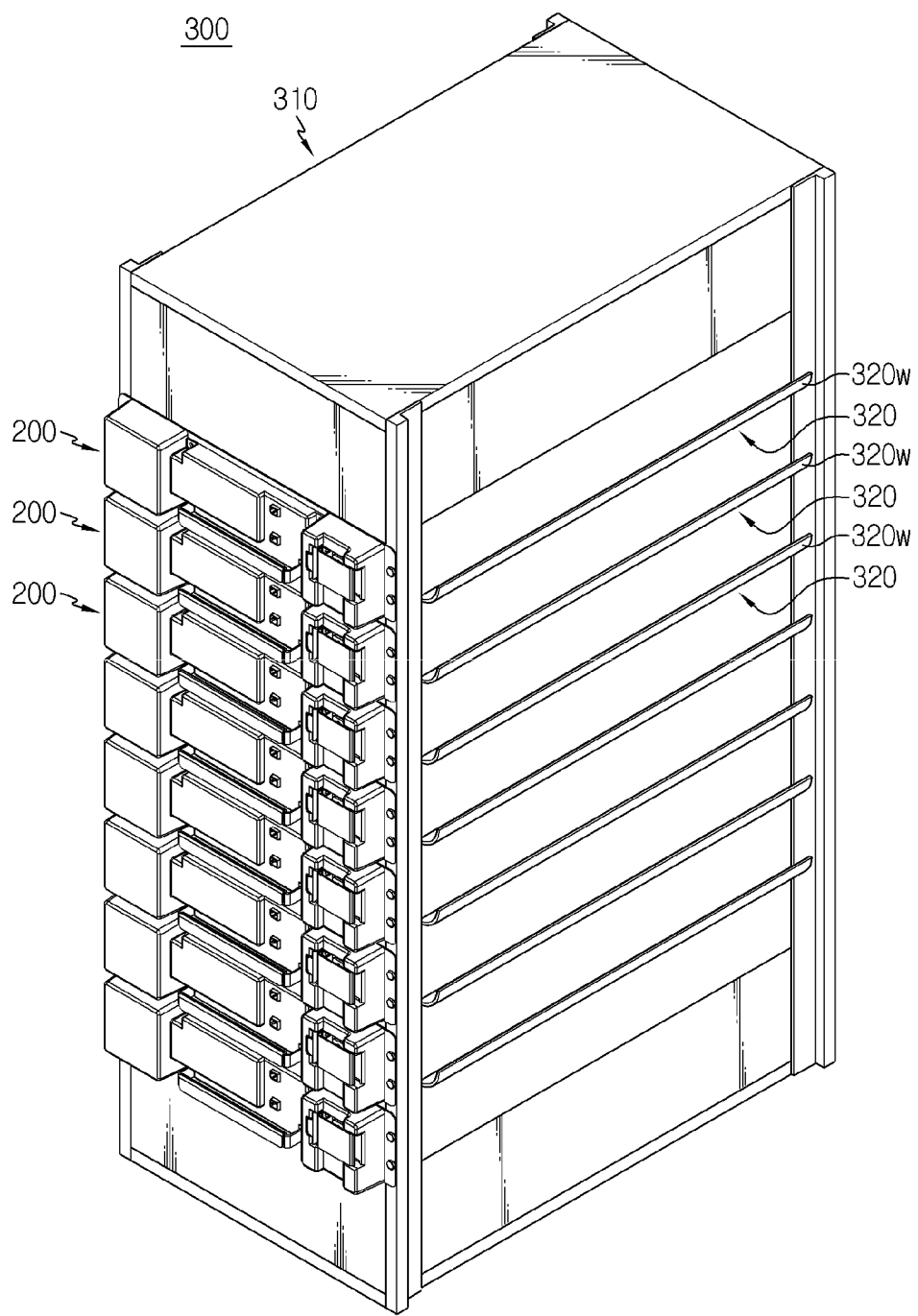
FIG. 9 is a schematic partial perspective view of a battery rack according to an embodiment of the present disclosure.

FIG. 9 is a schematic partial perspective view of a battery rack according to an embodiment of the present disclosure.

Referring to FIG. 9 together with FIG. 1, the battery rack 300 according to an embodiment of the present disclosure may include a plurality of battery modules 200. In addition, the battery rack 300 may include a rack case 310 to receive the plurality of battery modules 200 in a vertically stacked form. Inside, the battery module 200 may be mounted in the rack case 310 with the lower surface being parallel to the transverse plane.

Here, the rack case 310 is open to at least one side, and the battery module 200 may enter the internal space through the open side. However, the rack case 310 may be configured such that the open side can be closed.

For example, as shown in FIG. 9, the rack case 310 may have the rear side, the left side, the right side, the upper side and/or the lower side in a plate shape to prevent the battery module 200 received inside from being easily exposed to the outside.

The rack case 310 may include a flame retardant cover 320 interposed between the plurality of battery modules 200 to cover the top or bottom of the battery module 200.

Here, the flame retardant cover 320 may include a flame retardant material that is hard to burn. For example, the flame retardant material may be mica, vinyl chloride resin containing chlorine, paraffin chloride, decabromodiphenyl oxide and antimony trioxide.

At least a portion of the outer periphery 320w of the flame retardant cover 320 may extend such that it is exposed to the outside from between the plurality of battery modules 200. For example, as shown in FIG. 9, a plurality of flame retardant covers 320 may be interposed between the plurality of battery modules. The left and right outer peripheries 320w of the flame retardant cover 320 may extend such that they are exposed to the outside from between the plurality of battery modules 200. In addition, the entire outer periphery 320w may be bent upward. That is, when a fire occurs in any one of the plurality of battery modules 200, the structure of the outer periphery 320w may prevent the fire from spreading to the battery module 200 disposed at the upper position by the flame retardant cover 320 and the outer periphery 320w of the flame retardant cover 320.

According to this configuration of the present disclosure, at least a portion of the outer periphery 320w of the flame retardant cover 320 extends such that it is exposed to the outside from between the plurality of battery modules 200, and the extended outer periphery 320w is bent upward, thereby effectively preventing fires from spreading in the vertical direction to the plurality of battery modules 200 stacked in the vertical direction. Accordingly, it is possible to increase the safety of the battery rack.

Figure 10:
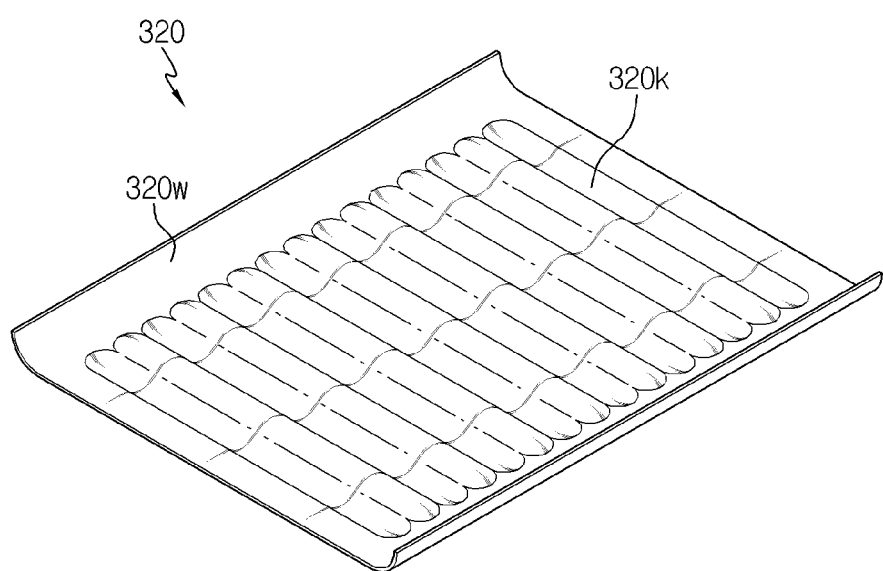
FIG. 10 is a schematic partial perspective view of a battery rack according to another embodiment of the present disclosure.

FIG. 10 is a schematic partial perspective view of a battery rack according to another embodiment of the present disclosure.

Referring to FIG. 10 together with FIG. 9, the flame retardant cover 320 may have a concave-convex structure 320k bent at a predetermined interval. The concave-convex structure 320k may include a concave portion and a convex portion extending linearly in the left-right direction.

According to this configuration of the present disclosure, the flame retardant cover 320 has the concave-convex structure 320k bent at the predetermined interval, thereby preventing the spread of a fire as well as providing a discharge passage to discharge high temperature gas produced by the fire to the outside. Accordingly, it is possible to increase the safety of the battery rack 300.

Although not shown, the battery rack 300 according to the present disclosure may further include other components such as a battery management system (BMS) (330 in FIG. 1) inside or outside the rack case 310.

An energy storage system according to the present disclosure may include one or more battery racks 300 according to the present disclosure described above. In particular, the energy storage system may include a plurality of battery racks 300 according to the present disclosure. In addition, the plurality of battery racks 300 may be electrically connected to each other. The energy storage system according to the present disclosure may be implemented in various forms, such as a smart grid system or an electric charging station.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

[Description of Reference Numerals]

| | |
|---|---|
| 200: battery module | 100: cell assembly |
| 110: secondary battery | 210: module housing |
| 211: gas passage | 230: flame retardant plate |
| 231: body | 236: flame barrier |
| 236h: gas vent hole | 236g: guide structure |
| 220: upper cover | 224, 226: top portion, side portion |
| 240: base plate | |
| 250: front cover | 260: rear cover |
| 264h: gas outlet | 226p: insertion protrusion |
| 130, 140: heat absorbing pad, heat insulating pad | |
| 270: busbar assembly | |
| 272, 276: busbar, busbar frame | |
| 300: battery rack | 310: rack case |
| 320: flame retardant cover | 320k: concave-convex structure |

INDUSTRIAL APPLICABILITY

The present disclosure relates to a battery module including a flame retardant plate. In addition, the present disclosure may be used in the industry related to a battery rack including a plurality of battery modules and an energy storage system including the battery rack.

What is claimed is:

1. A battery module comprising:
    at least two cell assemblies;
    a module housing having an upper cover formed by a top portion and a first side portion extending downward from a first side edge of the top portion;
    a first gas passage formed between the first side portion of the upper cover and a first side of the at least two cell assemblies for circulation of gas generated from the at least two cell assemblies; and
    a flame retardant plate in the first gas passage and extending between the at least two cell assemblies,
    wherein the first side portion of the upper cover is coupled to the flame retardant plate,
    wherein the flame retardant plate has a body between the at least two cell assemblies and a flame barrier extending from the body and into the first gas passage, and
    wherein the flame barrier has gas vent holes.

2. The battery module according to claim 1, wherein the flame retardant plate is planar.

3. The battery module according to claim 1, wherein the flame retardant plate has a plurality of gas vent holes.

4. The battery module according to claim 1, wherein the flame retardant plate is formed of an expandable material that expands in volume at a predetermined temperature.

5. The battery module according to claim 1, wherein the flame retardant plate has a multilayer structure including a central layer and a pair of outer layers.

6. The battery module according to claim 5, wherein a width of the outer layers in a left-right direction is equal to a width of a body of the flame retardant plate.

7. The battery module according to claim 1, wherein an inner surface of the first side portion has an insertion protrusion having a slit into which a portion of the flame retardant plate is inserted.

8. The battery module according to claim 1, wherein the flame retardant plate has a multilayer structure including at least one of a flame retardant layer, a heat insulating layer configured to prevent heat transfer, an expandable layer that expands in volume at a predetermined temperature, and a heat absorbing layer configured to absorb heat at a predetermined temperature.

9. The battery module according to claim 8, wherein the multilayer structure is a structure in which the expandable layer is interposed between two flame retardant layers, or a structure in which the heat insulating layer is interposed between the two flame retardant layers.

10. The battery module according to claim 1, wherein the flame retardant plate extends between the at least two cell assemblies and across a width of the module housing, and
    wherein the flame retardant plate extends into a second gas passage between a second side of the at least two cell assemblies and the module housing.

11. The battery module according to claim 1, wherein the first side portion of the upper cover is coupled to a side edge of the flame retardant plate.

12. The battery module according to claim 1, wherein the flame retardant plate fits within a vertical insertion protrusion extending from an inner surface of the module housing.

13. The battery module according to claim 1, wherein the flame retardant plate extends between a pair of busbar assemblies respectively attached to the at least two cell assemblies.

14. The battery module according to claim 1, wherein the body of the flame retardant plate does not have holes.

15. The battery module according to claim 1, wherein the at least two cell assemblies are spaced from each other in a first direction, and
    wherein the flame barrier extends from the body in a second direction.

16. The battery module according to claim 1, further comprising pair of busbar assemblies respectively attached to the at least two cell assemblies,
    wherein the first gas passage extends between the pair of busbar assemblies and the module housing.

* * * * *